United States Patent
Otsubo et al.

(10) Patent No.: US 9,837,795 B2
(45) Date of Patent: Dec. 5, 2017

(54) ESD PROTECTION DEVICE

(71) Applicant: Murata Manufacturing Co., Ltd., Kyoto (JP)

(72) Inventors: Yoshihito Otsubo, Kyoto (JP); Jun Adachi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 312 days.

(21) Appl. No.: 14/723,852

(22) Filed: May 28, 2015

(65) Prior Publication Data

US 2015/0263489 A1    Sep. 17, 2015

Related U.S. Application Data

(63) Continuation of application No. PCT/JP2013/083767, filed on Dec. 17, 2013.

(30) Foreign Application Priority Data

Dec. 19, 2012 (JP) ................. 2012-276918

(51) Int. Cl.
  *H01T 2/02* (2006.01)
  *H01T 4/10* (2006.01)
  (Continued)

(52) U.S. Cl.
  CPC ............. *H01T 2/02* (2013.01); *H01B 3/12* (2013.01); *H01T 4/10* (2013.01); *H01T 4/12* (2013.01); *H02H 9/06* (2013.01)

(58) Field of Classification Search
  CPC ........................................................ H01T 2/02
  See application file for complete search history.

(56) References Cited

U.S. PATENT DOCUMENTS

2002/0008952 A1    1/2002  Shin
2011/0227196 A1*   9/2011  Adachi ............... H01T 1/20
                                                           257/537
2013/0077199 A1    3/2013  Ikeda

FOREIGN PATENT DOCUMENTS

JP    2002-093546 A    3/2002
WO    2008/146514 A1   12/2008
(Continued)

OTHER PUBLICATIONS

International Search Report issued in Application No. PCT/JP2013/083767 dated Mar. 11, 2014.
(Continued)

*Primary Examiner* — Scott Bauer
(74) *Attorney, Agent, or Firm* — Pearne & Gordon LLP (57) ABSTRACT

An ESD protection device of the present disclosure includes a ceramic multilayer structure inside which a cavity portion is formed, at least one pair of discharge electrodes arranged inside the ceramic multilayer structure, and outer electrodes formed on the surface of the ceramic multilayer structure and connected to the discharge electrodes, wherein the pair of discharge electrodes are arranged in such a way that one end-face of one discharge electrode and one end-face of the other discharge electrode are opposed to each other through the cavity portion, and the cavity portion is formed as a single cavity occupying a region between the opposed end-faces, regions along other end-faces connected to the opposed end-faces via corner portions, and, on first principal surfaces, regions along the opposed end-faces and regions along the other end-faces.

4 Claims, 6 Drawing Sheets

(51) Int. Cl.
*H01T 4/12* (2006.01)
*H01B 3/12* (2006.01)
*H02H 9/06* (2006.01)

(56) References Cited

FOREIGN PATENT DOCUMENTS

WO     2011/145598 A1    11/2011
WO     2013/115054 A1    8/2013

OTHER PUBLICATIONS

Translation of Written Opinion issued in Application No. PCT/JP2013/083767 dated Mar. 11, 2014.

\* cited by examiner

ESD PROTECTION DEVICE

FIELD OF THE DISCLOSURE

The present disclosure relates to ESD protection devices each including at least one pair of discharge electrodes that face each other across a cavity portion formed inside a ceramic multilayer structure.

DESCRIPTION OF THE RELATED ART

Conventionally, electrostatic discharge (ESD) protection devices, such as for example an ESD protection device described in patent document 1 (WO2008/146514), are used for protecting circuits of electronic devices from static electricity.

Figure 10A:
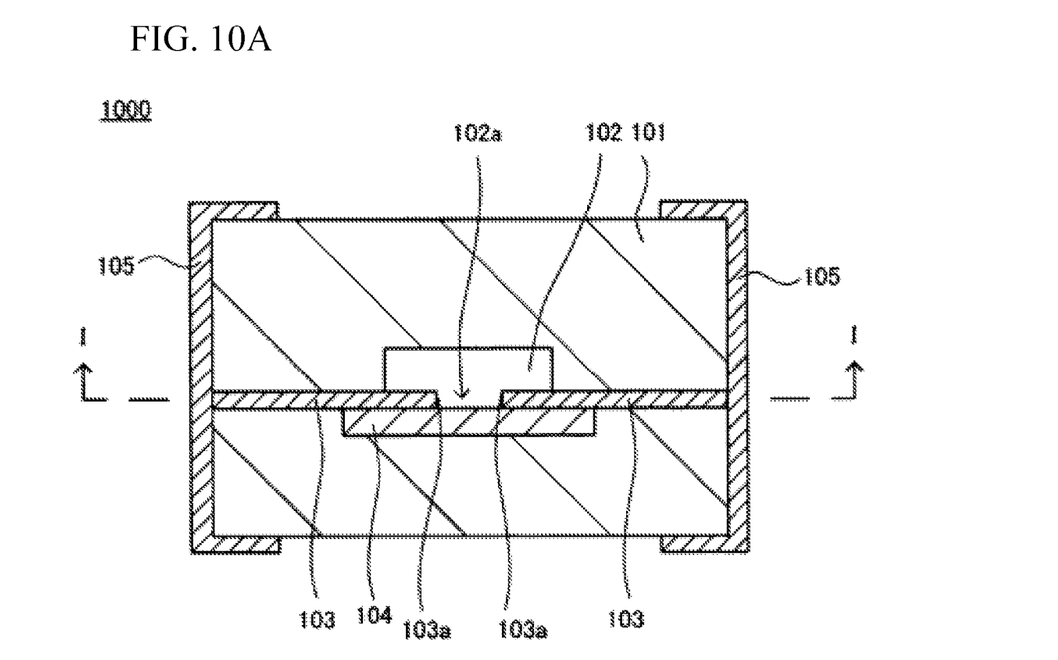
FIGS. 10(A) and 10(B) are cross-sectional diagrams of a prior art ESD protection device 1000.
Figure 10B:
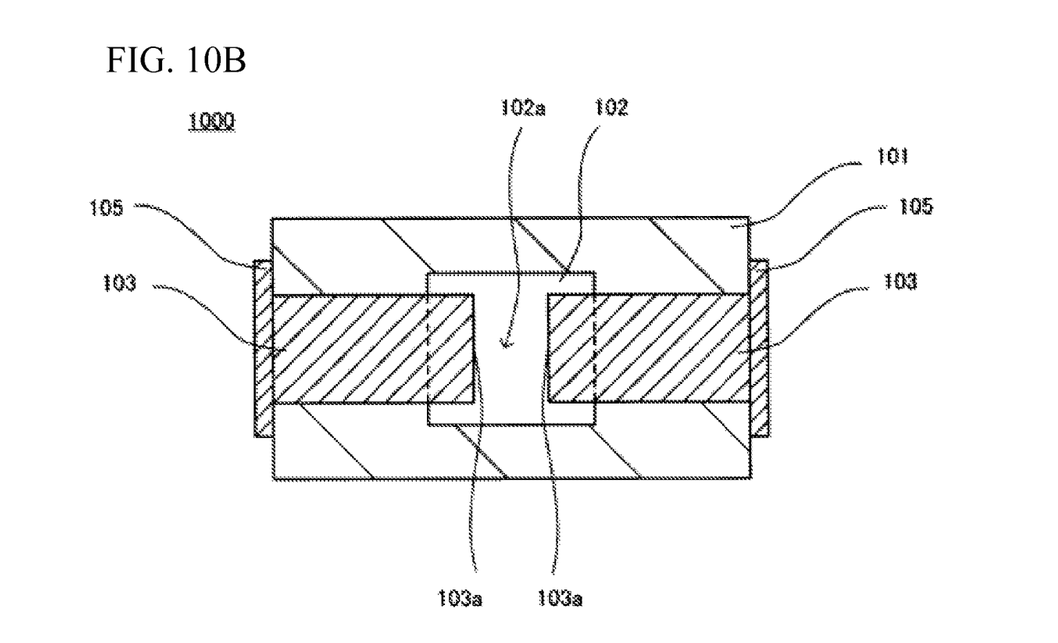

FIGS. 10(A) and 10(B) depict a prior art ESD protection device 1000 described in patent document 1. FIG. 10(A) is a cross-sectional diagram of the ESD protection device 1000, and FIG. 10(B) is a cross-sectional diagram at the line I-I of the ESD protection device 1000 in FIG. 10(A).

The ESD protection device 1000 includes a ceramic multilayer structure 101 that is formed by stacking a plurality of ceramic layers. A cavity portion 102 is formed inside the ceramic multilayer structure 101.

A pair of discharge electrodes 103 is arranged inside the plurality of ceramic layers. In the pair of discharge electrodes 103, each discharge electrode 103 includes a first principal surface, a second principal surface, and four end-faces 103a that connect the first principal surface and the second principal surface. Of the pair of discharge electrodes 103, one end-face 103a of one discharge electrode 103 and one end-face 103a of the other discharge electrode 103 are arranged so as to face each other across the cavity portion 102.

On the surface of the ceramic multilayer structure 101, outer electrodes 105 that are connected to the discharge electrodes 103 are formed.

An auxiliary discharge electrode 104 is formed as a single member across the second principal surface sides of the pair of discharge electrodes 103 and a region 102a between the opposed end-faces 103a of the pair of discharge electrodes 103 on the bottom region of the cavity portion 102. The auxiliary discharge electrode 104 contains an electrically conductive material made of a metal and an insulating material made of a ceramic. Portions of the discharge electrodes 103 exposed to the cavity portion 102 form junctions with the auxiliary discharge electrode 104 only at the second principal surfaces of the discharge electrodes 103.

The ESD protection device 1000 is used, for example, by placing between ground and a signal line of a circuit. When a voltage (a voltage equal to or larger than the discharge inception voltage) large enough to cause electric breakdown is applied across the pair of discharge electrodes 103, a discharge occurs between the discharge electrodes 103 inside the cavity portion 102. This discharge guides an excess voltage to ground, thereby protecting a subsequent circuit.

Patent Document 1: International Publication No. WO2008/146514

BRIEF SUMMARY OF THE DISCLOSURE

However, in the foregoing prior art ESD protection device 1000, the portions of the discharge electrodes 103 exposed to the cavity portion 102 are easily peeled from the auxiliary discharge electrode 104 by impacts applied at the times of discharges. Thus, there is a problem in that in some cases the discharge inception voltage varies as the discharge is repeated.

According to the present disclosure is to provide an ESD protection device whose discharge inception voltage deviation due to repeated discharges is made smaller while allowing the operation at low discharge inception voltage comparable to that of prior art.

An ESD protection device of the present disclosure includes: a ceramic multilayer structure formed by stacking a plurality of ceramic layers; a cavity portion formed inside the ceramic multilayer structure; at least one pair of discharge electrodes, each discharge electrode including a first principal surface, a second principal surface, a plurality of end-faces connecting the first principal surface and the second principal surface, and corner portions connecting adjacent end-faces of the plurality of end-faces; and an outer electrode formed on a surface of the ceramic multilayer structure and connected to the discharge electrode, wherein the pair of discharge electrodes are arranged in such a way that one end-face of one discharge electrode and one end-face of another discharge electrode are opposed to each other through the cavity portion, and the cavity portion is formed as a single cavity expanding across a region between the end-faces opposed to each other, regions along other end-faces connected to the end-faces opposed to each other via the corner portions, and, on the first principal surfaces, regions along the end-faces opposed to each other and regions along the other end-faces.

Accordingly, the present disclosure provides the ESD protection device whose discharge inception voltage deviation due to repeated discharges is made smaller while allowing the operation at low discharge inception voltage comparable to that of prior art.

DISCLOSURE DETAILED DESCRIPTION OF THE DISCLOSURE

First Embodiment

Figure 1A:
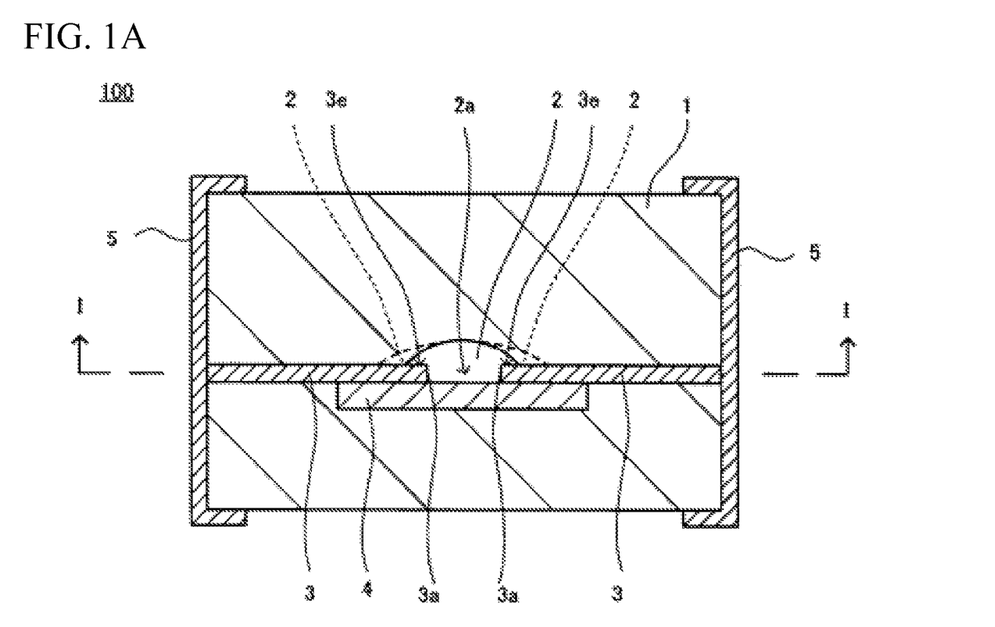
FIG. 1(A) is a cross-sectional diagram of an ESD protection device 100 according to a first embodiment of the present disclosure.
Figure 1B:
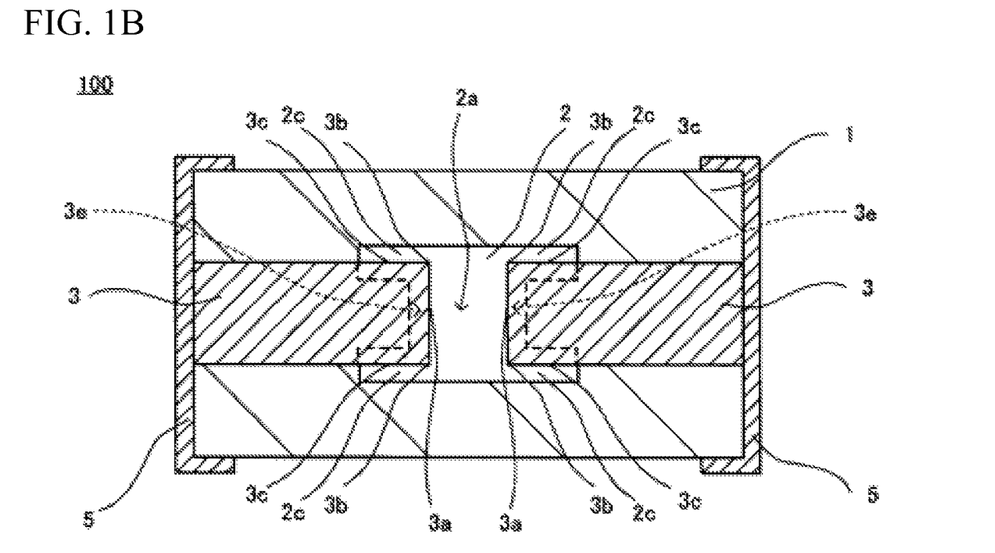
FIG. 1(B) is a cross-sectional diagram at a line I-I of the ESD protection device 100 in FIG. 1(A).

FIGS. 1(A) and 1(B) depict an ESD protection device 100 according to the first embodiment of the present disclosure. FIG. 1(A) is a cross-sectional diagram of the ESD protection device 100, and FIG. 1(B) is a cross-sectional diagram at the line I-I of the ESD protection device 100 in FIG. 1(A).

The ESD protection device 100 includes a ceramic multilayer structure 1 that is cuboid in shape and formed by stacking a plurality of ceramic layers. The ceramic multilayer structure 1 is composed of, for example, a BaO—$Al_2O_3$—$SiO_2$ system low-temperature calcined ceramic material (hereinafter, referred to as BAS material).

A pair of discharge electrodes 3 that is cuboid in shape is arranged inside the plurality of ceramic layers. In the pair of discharge electrodes 3, each discharge electrode 3 includes a first principal surface, a second principal surface, four end-faces 3a that connect the first principal surface to the second principal surface, and four corner portions 3b that connect adjacent end-faces of the four end-faces 3a. The discharge electrodes 3 are composed of an electrically conductive material such as, for example, Cu or the like.

An auxiliary discharge electrode 4 is formed as a single member across the second principal surface sides of the pair of discharge electrodes 3 and a region 2a between the opposed end-faces 3a of the pair of discharge electrodes 3 on the bottom surface of the cavity portion 2. The auxiliary discharge electrode 4 contains, for example, an electrically conductive material such as alumina-coated Cu particles or the like and a semiconductor material composed of a ceramic such as SiC or the like.

On the surface of the ceramic multilayer structure 1, outer electrodes 5 that are connected to the discharge electrodes 3 are formed. The outer electrodes 5 are composed of, for example, Ag.

Inside the ceramic multilayer structure 1, the cavity portion 2 is formed. Of the pair of discharge electrodes 3, one end-face 3a of one discharge electrode 3 and one end-face 3a of the other discharge electrode 3 are arranged so as to face each other across the cavity portion 2. In planar view, the pair of discharge electrodes 3 is arranged in such a way that the discharge electrodes 3 that are rectangular in shape face each other at their respective shorter sides. The cavity portion 2 is formed as a single cavity occupying the region 2a, four regions 2c, and two regions 3e. The region 2a lies between the opposed end-faces 3a of the pair of discharge electrodes 3. The regions 2c lie along other end-faces 3c connected to the opposed end-faces 3a via the corner portions 3b. The regions 3e are U-shaped and lie on the first principal surfaces of the discharge electrodes 3 along the opposed end-faces 3a and the other end-faces 3c.

As described above, the discharge electrodes 3 are composed of the electrically conductive material such as Cu or the like, and the auxiliary discharge electrode 4 is composed of a mixed material of the electrically conductive material such as Cu or the like and the semiconductor material composed of the ceramic such as SiC or the like. In other words, since the discharge electrodes 3 and the auxiliary discharge electrode 4 are different in material type, their junction characteristics are not good, and the discharge electrodes 3 exposed to the cavity portion 2 are easily peeled from the auxiliary discharge electrode 4 by impacts applied at the times of discharges.

However, compared to the prior art ESD protection device 1000 such as the one depicted in FIGS. 10(A) and 10(B), in the ESD protection device 100 with the foregoing configuration, the area of the portions of the discharge electrodes 3 exposed to the cavity portion 2 is reduced by forming the ceramic multilayer structure 1 so as to occupy a larger area on the discharge electrodes 3 and leaving the U-shaped regions 3e on the first principal surfaces of the pair of discharge electrodes 3 along the opposed end-faces 3a and the other end-faces 3c as the cavity portion 2. This suppresses the peeling of the discharge electrodes 3 from the auxiliary discharge electrode 4 by impacts applied at the times of discharges. Thus, the change in discharge inception voltage due to repeated discharges may be reduced.

Further, in the ESD protection device 100, the shape of the cavity portion 2 is made smaller than that of prior art while keeping vicinities of discharge-prone portions of the discharge electrodes 3 as the portions exposed to the cavity portion 2. Here, the discharge-prone portions include sides of the discharge electrodes 3 connecting the opposed end-faces 3a to the U-shaped regions 3e, sides connecting the other end-faces 3c to the U-shaped regions 3e, and the corner portions 3b. This allows maintaining the discharge inception voltage at low voltage comparable to that of prior art.

As described above, the ESD protection device 100 according to the first embodiment of the present disclosure allows to reduce the change in discharge inception voltage due to repeated discharges while maintaining the discharge inception voltage at low voltage comparable to that of prior art.

Further, in the ESD protection device 100, boundaries exposed to the cavity portion 2 between the ceramic multilayer structure 1 and the first principal surfaces of the discharge electrodes 3 form letter U shapes. The shapes of the boundaries are not straight lines but the U shapes. Thus, at the time of mounting the ESD protection device 100 on a board by reflow, a force that occurs with thermal expansion of air inside the cavity portion 2 and applies to the ceramic multilayer structure 1 is dispersed. Accordingly, the ceramic multilayer structure 1 is less likely to come off from the first principal surface sides of the discharge electrodes 3. As a result, an increase in the volume of the cavity portion 2 is less likely to occur after the reflow, and further an expansion in the area of the ceramic multilayer structure 1, which forms a junction with the auxiliary discharge electrode 4 only at the second principal surface, may be suppressed. Thus, the peeling of the discharge electrodes 3 may be suppressed.

Next, an example of a fabrication method of the ESD protection device 100 according to the first embodiment of the present disclosure is described.

First, a BAS material is formed by preparing raw materials such as Ba, Al, and Si as principle elements, mixing at a predetermined proportion, and subjecting to a preliminary calcination at 800 to 1000 degrees C. An obtained BAS material is pulverized with a zirconia ball mill to form a ceramic material composed of the BAS material having an average particle diameter of about 1 to 2 μm. An organic solvent such as toluene, Ekinen, or the like is added to the ceramic material, and this ceramic material with the organic solvent is mixed. Subsequently, a binder and a plasticizing agent are added to the mixture, and the mixture containing the binder and the plasticizing agent is mixed to form a slurry.

Next, the slurry is molded by doctor blade method, and a plurality of ceramic green sheets each having a thickness of 10 to 50 μm are formed.

Next, an auxiliary discharge electrode forming paste containing an electrically conductive material and a semiconductor material is formed. Specifically, alumina-coated Cu particles having an average particle diameter of about 3 to 10 μm and a ceramic material composed of SiC particles having an average particle diameter of about 1 to 2 μm are mixed at a predetermined proportion. Subsequently, a binder resin and a solvent are added to the mixture, and the mixture containing the binder resin and the solvent is stirred and mixed with a triple roll to form the auxiliary discharge electrode forming paste.

Next, a pre-calcined auxiliary discharge electrode 4 is formed by painting the auxiliary discharge electrode forming paste over one of the principal surfaces of the ceramic green sheet by screen printing.

Next, a solvent is added to a binder resin composed of Cu powder, ethylcellulose, and the like. The binder resin with the solvent is stirred and mixed with a triple roll to form a discharge electrode forming paste.

Next, a pre-calcined pair of discharge electrodes 3 is formed by painting the discharge electrode forming paste by screen printing.

Next, a resin paste is continuously painted by screen painting across the region 2a between the opposed end-faces 3a, the regions 2c along the other end-faces 3c connected to the opposed end-faces 3a via the corner portions 3b, and the U-shaped regions 3e along the opposed end-faces 3a and the other end-faces 3c on the first principal surfaces. As the resin paste, a material that would dissipate during calcination is used. For example, PET, polypropylene, ethylcellulose, acrylic resin, and the like may be used.

Next, a plurality of ceramic green sheets is stacked in a predetermined order and pressure-bonded. This forms the ceramic multilayer structure 1 in which the resin paste, the discharge electrodes 3, and the auxiliary discharge electrode 4 are stacked.

Next, the ceramic multilayer structure 1 is divided by cutting with a micro cutter.

Next, the ceramic multilayer structures 1 thus divided are subjected to calcination under a $N_2$ atmosphere. The resin paste is dissipated by the calcination, and the cavity portion 2 is formed.

Next, the outer electrodes 5 that are electrically connected to the discharge electrodes 3 are formed by painting and baking an electrically conductive paste containing Ag or the like on the surface of the ceramic multilayer structure 1.

Finally, if necessary, a film composed of Ni and Sn is formed on the outer electrode 5 by electrolytic plating. This completes the fabrication of the ESD protection device 100 such as depicted in FIGS. 1(A) and 1(B).

Assessment of the discharge inception voltages at an initial stage and after repeated discharges is conducted on the ESD protection device 100 according to the first embodiment of the present disclosure.

The discharge inception voltage is measured by conducting the electrostatic discharge immunity test specified in IEC61000-4-2. Specifically, a voltage of 8 kV is applied to the ESD protection device by contact discharge, and a peak voltage detected at the protected circuit side is measured as the discharge inception voltage.

As the discharge inception voltage after repeated discharges, a peak voltage is measured by a method similar to the one described above after applying a voltage of 8 kV one hundred times by contact discharge.

Figure 2:
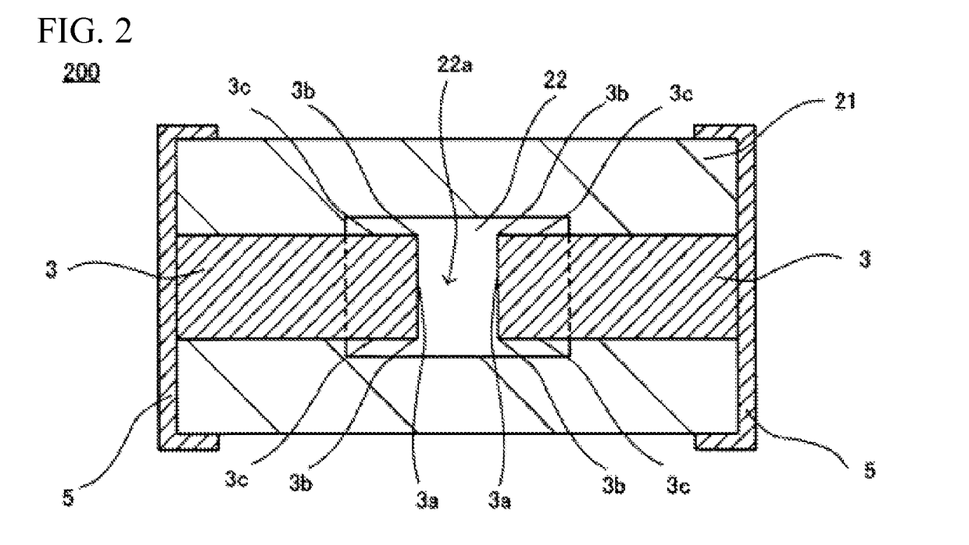
FIG. 2 is a cross-sectional diagram of a comparison example 1 for the ESD protection device 100 according to the first embodiment of the present disclosure.
Figure 3:
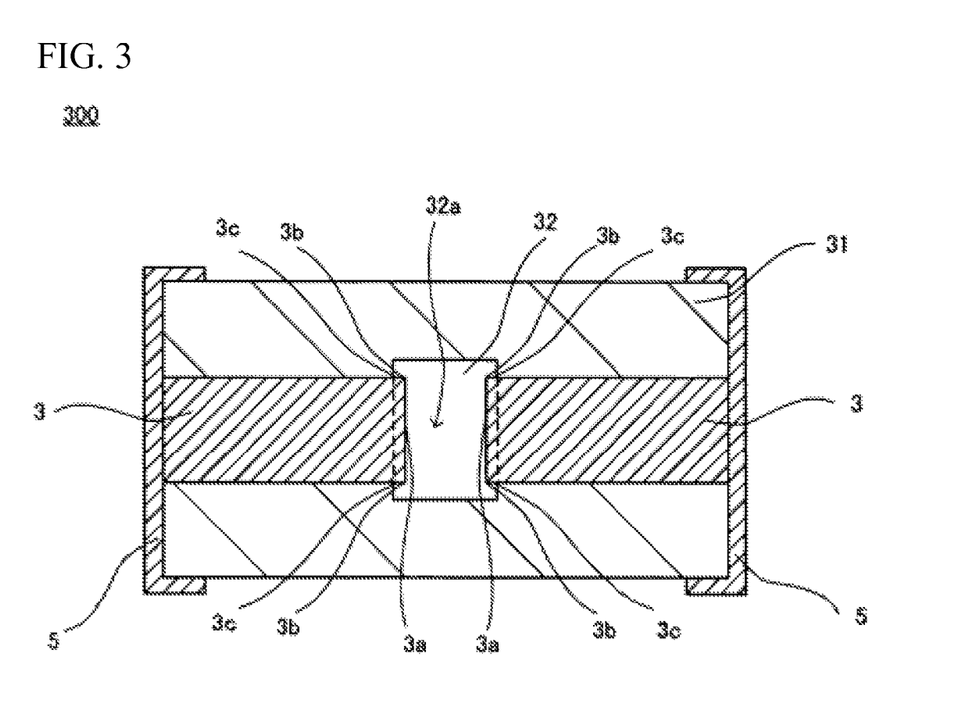
FIG. 3 is a cross-sectional diagram of a comparison example 2 for the ESD protection device 100 according to the first embodiment of the present disclosure.

As an assessment target, a working example 1 is fabricated by the same fabrication method as the one described above. The working example 1 has the same configuration as that of the ESD protection device 100 according to the first embodiment of the present disclosure. Further, as comparison examples to the working example 1, an ESD protection device 200 serving as a comparison example 1 and an ESD protection device 300 serving as a comparison example 2 are fabricated by altering the painting pattern of the resin paste used in the working example 1. The comparison example 1 and the comparison example 2 are different from the working example 1 only in the shape and size of the cavity portion. As depicted in FIG. 2, in the comparison example 1, a cavity portion 22 that is rectangular in planar view is formed as is the case with the prior art (patent document 1) depicted in FIGS. 10(A) and 10(B). As depicted in FIG. 3, in the comparison example 2, a rectangular cavity portion 32 is formed. In planar view, the cavity portion 32 has less lateral width than that of the cavity portion 22 of the comparison example 1.

Measurement results of the discharge inception voltage of the working example 1, the comparison example 1, and the comparison example 2 are summarized in table 1.

TABLE 1

| | FIG. | Discharge Inception Voltage (V) (Initial Value) | Discharge Inception Voltage (V) After (Repeated Use) | Change in Discharge Inception Voltage (V) | Rate of Change (%) |
|---|---|---|---|---|---|
| Working example 1 | FIGS. 1(A) and 1(B) | 481 | 538 | 57 | 12 |
| Comparison example 1 | FIG. 2 | 522 | 637 | 115 | 22 |
| Comparison example 2 | FIG. 3 | 562 | 594 | 32 | 5.7 |

As is clear from table 1, in the working example 1, the change from the initial discharge inception voltage due to repeated discharges is reduced compared to the prior art comparison example 1. Further, in the working example 1, the initial discharge inception voltage is kept at a lower value than that of the comparison example 1. In other words, the working example 1 allows to reduce the change in discharge inception voltage due to repeated discharges compared to the prior art comparison example 1 while maintaining the initial discharge inception voltage at low voltage comparable to that of prior art.

Meanwhile, the comparison example 2, whose lateral width of the rectangle cavity portion is less than that of the comparison example 1, has a problem in that the initial discharge inception voltage becomes higher than that of the comparison example 1 although the change in discharge inception voltage due to repeated discharges becomes smaller than that of the comparison example 1. In contrast, the working example 1 allows maintaining the initial discharge inception voltage at low voltage comparable to that of the comparison example 1 while reducing the change in discharge inception voltage due to repeated discharges compared to that of the comparison example 1.

The examples of the configuration and the fabrication method of the ESD protection device 100 according to the first embodiment of the present disclosure have been described in the foregoing section. However, it is to be understood that the present disclosure is not limited to the foregoing contents, and that various modifications may be made within the scope of the present disclosure.

Figure 4:
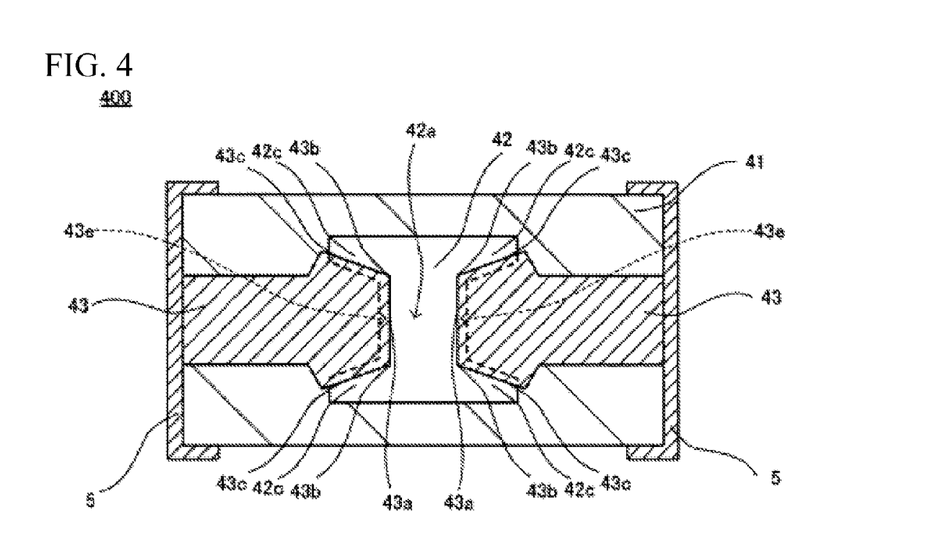
FIG. 4 is a cross-sectional diagram of a modified example of the ESD protection device 100 according to the first embodiment of the present disclosure.

FIG. 4 is a cross-sectional diagram of a modified example 400 of the ESD protection device 100 according to the first embodiment of the present disclosure. The modified example 400 is different from the foregoing ESD protection device 100 in that, in each one of a pair of discharge electrodes 43, other end-faces 43c that are connected to opposed end-faces 43a via corner portions 43b are formed so as to become wider in planar view as the distances from the opposed end-faces 43a increase. Also, in this case, the change in discharge inception voltage due to repeated discharges may be reduced while maintaining the discharge inception voltage at low voltage comparable to that of prior art.

Further, in the foregoing embodiment, the auxiliary discharge electrode 4 is formed. Alternatively, the auxiliary discharge electrode 4 may not be formed. Even in the case where the auxiliary discharge electrode 4 is not formed, the discharge electrodes 3 are easily peeled from the ceramic multilayer structure 1 since the discharge electrodes 3 and the ceramic multilayer structure 1, which form junctions therebetween, are composed of different materials. Accordingly, even in this case, the application of the present disclosure has a significant meaning.

In the ESD protection device in which the auxiliary discharge electrode 4 is not formed, forming the cavity portion 2 into a shape similar to that of the present disclosure allows to reduce the change in discharge inception voltage due to repeated discharges while maintaining the discharge inception voltage at low voltage comparable to that of prior art.

Further, in the foregoing embodiment, the auxiliary discharge electrode 4 contains the electrically conductive material and the semiconductor material. Instead of the semiconductor material, the auxiliary discharge electrode 4 may contain an insulating material such as the BAS material or the like. Alternatively, the auxiliary discharge electrode 4 may contain both the semiconductor material and the insulating material in addition to the electrically conductive material.

Second Embodiment

Figure 5:
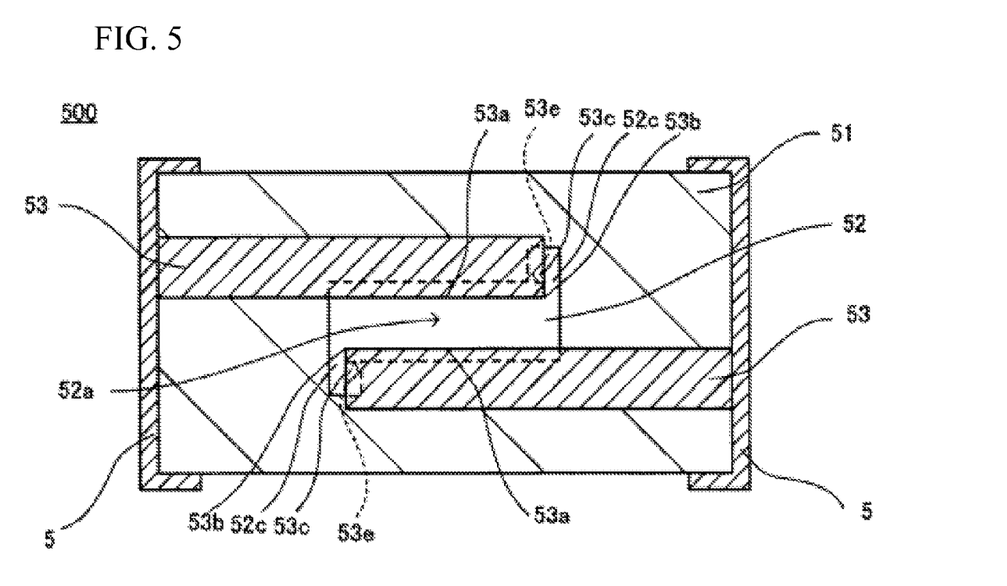
FIG. 5 is a cross-sectional diagram of an ESD protection device 500 according to a second embodiment of the present disclosure.

FIG. 5 is a cross-sectional diagram of an ESD protection device 500 according to the second embodiment of the present disclosure.

In the ESD protection device 100 according to the first embodiment, the end-faces 3a at the shorter sides of the pair of the rectangular discharge electrodes 3 are arranged so as to be opposed to each other in planar view. In contrast, in the ESD protection device 500 according to the second embodiment, end-faces 53a at the longer sides of a pair of rectangular discharge electrodes 53 are arranged so as to be partially opposed to each other.

In the ESD protection device 100, each one of the pair of discharge electrodes 3 includes two corner portions 3b for each opposed end-face 3a. In contrast, in the ESD protection device 500, each one of the pair of discharge electrodes 53 includes one corner portion.

Further, in the ESD protection device 100, the cavity portion 2 is formed in the U-shaped regions on the first principal surfaces of the discharge electrodes 3. In contrast, the ESD protection device 500, a cavity portion 52 is formed in L-shaped regions.

Further, in the ESD protection device 100, the corner portions 3b are arranged so as to be directly opposed to each other. In contrast, in the ESD protection device 500, a corner portion 53b and the end-face 53a are arranged to be opposed to each other, and the corner portions 53b are arranged not to be directly opposed to each other.

Also, in this case, the change in discharge inception voltage due to repeated discharges may be reduced while maintaining the discharge inception voltage at low voltage comparable to that of prior art.

Further, as depicted in FIG. 5, in the ESD protection device 500 according to the second embodiment, the opposed end-face 53a are arranged in parallel to a longer length direction of a rectangle ceramic multilayer structure 51 in planar view. Thus, the opposing length of the opposed discharge electrodes 53 may be increased by extending the lengths of the opposed end-face 53a. This increases the permissible number of repeated use of the ESD protection device 500.

Further, in the ESD protection device 500, the corner portion 53b and the end-face 53a are opposed to each other. Thus, compared to cases where the corner portions 3b are arranged so as to be opposed to each other, such as in the case with the ESD protection device 100, the discharge inception voltage may be stabilized against variation in positions of the discharge electrodes 3 due to misalignment of printing and the like.

A fabrication method similar to that of the ESD protection device 100 according to the first embodiment may be used for the ESD protection device 500 according to the second embodiment. The fabrication method of the second embodiment is different from the fabrication method of the first embodiment in that a shape to be painted with the resin paste and a shape to be painted with the discharge electrode paste are modified so as to match the shapes of the cavity portion 52 and the discharge electrodes 53.

As is the case with the ESD protection device 100 of the first embodiment, assessment of the discharge inception voltages is conducted on the ESD protection device 500 according to the second embodiment of the present disclosure.

Figure 6:
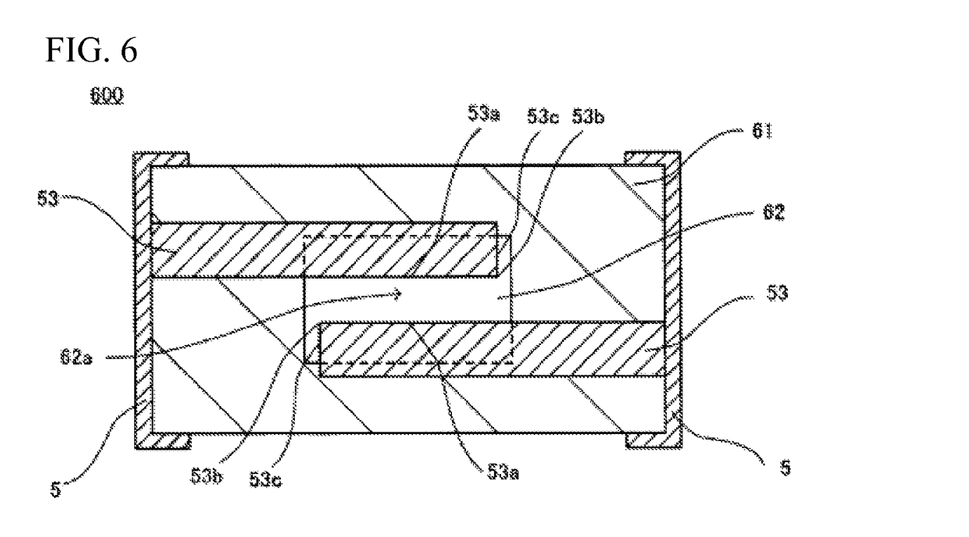
FIG. 6 is a cross-sectional diagram of a comparison example 3 for the ESD protection device 500 according to the second embodiment of the present disclosure.
Figure 7:
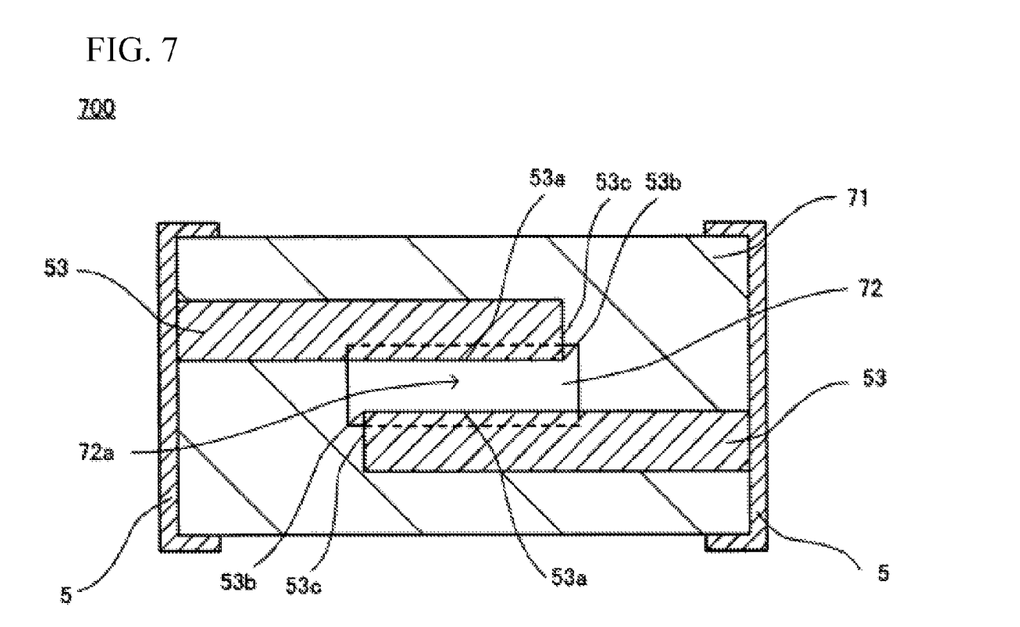
FIG. 7 is a cross-sectional diagram of a comparison example 4 for the ESD protection device 500 according to the second embodiment of the present disclosure.

As an assessment target, a working example 2 having the same configuration as that of the ESD protection device 500 according to the second embodiment of the present disclosure is fabricated. Further, as comparison examples against the working example 2, an ESD protection device 600 serving as a comparison example 3 and an ESD protection device 700 serving as a comparison example 4 are fabricated by altering painting patterns of the resin paste and the discharge electrode paste used in the working example 2. The comparison example 3 and the comparison example 4 are different from the working example 2 only in the shapes and sizes of the cavity portion and the discharge electrodes. As depicted in FIG. 6, in the comparison example 3, a rectangular cavity portion 62 is formed. As depicted in FIG. 7, in the comparison example 4, a rectangular cavity portion 72 whose vertical width is less than that of the cavity portion 62 of the comparison example 3 is formed.

Measurement results of the discharge inception voltage of the working example 2, the comparison example 3, and the comparison example 4 are summarized in table 2.

TABLE 2

|  | FIG. | Discharge Inception Voltage (V) (Initial Value) | Discharge Inception Voltage (V) (After Repeated Use) | Change in Discharge Inception Voltage (V) | Rate of Change (%) |
|---|---|---|---|---|---|
| Working example 2 | FIG. 5 | 469 | 524 | 55 | 12 |
| Comparison example 3 | FIG. 6 | 513 | 621 | 108 | 21 |
| Comparison example 4 | FIG. 7 | 558 | 586 | 28 | 5.0 |

As is clear from table 2, the working example 2 allows to reduce the change in discharge inception voltage due to repeated discharges compared to that of the comparison example 3 while maintaining the initial discharge inception voltage at low voltage comparable to that of prior art, as is the case with the working example 1.

The examples of the configuration and the fabrication method of the ESD protection device 500 according to the second embodiment of the present disclosure have been described in the foregoing section. However, it is to be understood that the present disclosure is not limited to the foregoing contents, and that various modifications may be made within the scope of the present disclosure.

Figure 8:
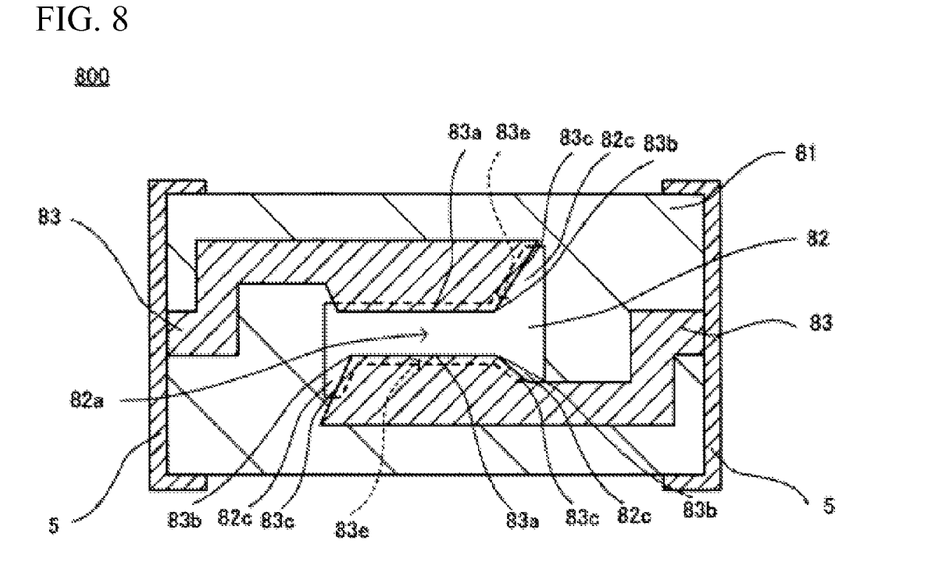
FIG. 8 is a cross-sectional diagram of a first modified example of the ESD protection device 500 according to the second embodiment of the present disclosure.
Figure 9:
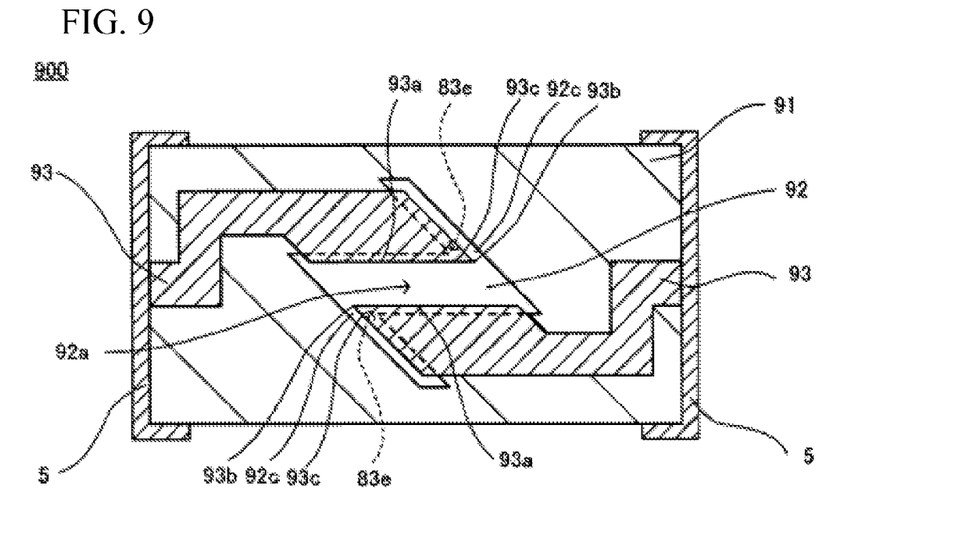
FIG. 9 is a cross-sectional diagram of a second modified example of the ESD protection device 500 according to the second embodiment of the present disclosure.

FIG. 8 and FIG. 9 are cross-sectional diagrams of a first modified example 800 and a second modified example 900 of the ESD protection device 500 according to the second embodiment of the present disclosure, respectively.

The modified example 800 is different from the foregoing ESD protection device 500 in that, in each one of a pair of discharge electrodes 83, other end-faces 83c that are connected to opposed end-faces 83a via corner portions 83b are formed so as to become wider in planar view as the distances from the opposed end-faces 83a increase.

In the second modified example 900, top end portions including opposed end-faces 93a of discharge electrodes 93 are formed into parallelogram shapes in planar view.

Also in these cases of the first modified example 800 and the second modified example 900, the change in discharge inception voltage due to repeated discharges may be reduced while maintaining the discharge inception voltage at low voltage comparable to that of prior art.

1 Ceramic multilayer structure
2 Cavity portion
2a Region between opposed end-faces of pair of discharge electrodes
2c Region along other end-face of pair of discharge electrodes
3 Discharge electrode
3a Opposed end-face of discharge electrode
3b Corner portion of discharge electrode
3c Other end-face of discharge electrode
3e Region on first principal surface of discharge electrode
4 Auxiliary discharge electrode
5 Outer electrode
100, 400, 500, 800, 900 ESD protection device

The invention claimed is:

1. An ESD protection device comprising:
a ceramic multilayer structure including a plurality of ceramic layers stacked together;
a cavity portion formed inside the ceramic multilayer structure;
at least one pair of discharge electrodes, each discharge electrode including a first principal surface, a second principal surface, a plurality of end-faces connecting the first principal surface to the second principal surface, and corner portions connecting adjacent end-faces of the plurality of end-faces; and
an outer electrode formed on a surface of the ceramic multilayer structure and connected to the discharge electrode, wherein
each pair of the at least one pair of discharge electrodes are arranged in such a way that one end-face of one discharge electrode and one end-face of another discharge electrode are opposed to each other through the cavity portion, and
the cavity portion is formed as a single cavity occupying a region between end-faces opposed to each other, regions along other end-faces connected to the end-faces opposed to each other via the corner portions, and, on the first principal surfaces, regions along the end-faces opposed to each other and regions along the other end-faces,
wherein in the each pair of the at least one pair of discharge electrodes, the first principal surface exposed to the cavity portion is U-shaped.

2. The ESD protection device according to claim 1, further comprising an auxiliary discharge electrode formed on the second principal surface of the each pair of discharge electrodes and a bottom region of the cavity portion between the end-faces of the each pair of discharge electrodes opposed to each other,
wherein the auxiliary discharge electrode comprises an electrically conductive material and at least one of a semiconductor material and an insulating material.

3. An ESD protection device comprising:
a ceramic multilayer structure including a plurality of ceramic layers stacked together;
a cavity portion formed inside the ceramic multilayer structure;
at least one pair of discharge electrodes, each discharge electrode including a first principal surface, a second principal surface, a plurality of end-faces connecting the first principal surface to the second principal surface, and corner portions connecting adjacent end-faces of the plurality of end-faces; and
an outer electrode formed on a surface of the ceramic multilayer structure and connected to the discharge electrode, wherein
each pair of the at least one pair of discharge electrodes are arranged in such a way that one end-face of one discharge electrode and one end-face of another discharge electrode are opposed to each other through the cavity portion, and
the cavity portion is formed as a single cavity occupying a region between end-faces opposed to each other, regions along other end-faces connected to the end-faces opposed to each other via the corner portions, and, on the first principal surfaces, regions along the end-faces opposed to each other and regions along the other end-faces, wherein
in the each pair of the at least one pair of discharge electrodes, the first principal surface exposed to the cavity portion is L-shaped.

4. The ESD protection device according to claim 3, further comprising an auxiliary discharge electrode formed on the second principal surface of the each pair of discharge electrodes and a bottom region of the cavity portion between the end-faces of the each pair of discharge electrodes opposed to each other, wherein the auxiliary discharge electrode comprises an electrically conductive material and at least one of a semiconductor material and an insulating material.

* * * * *